Dec. 26, 1933.  J. PFAFFENBERGER  1,941,319
CURRENT RESPONSIVE INDICATING AND RECORDING INSTRUMENT
Filed Nov. 11, 1932
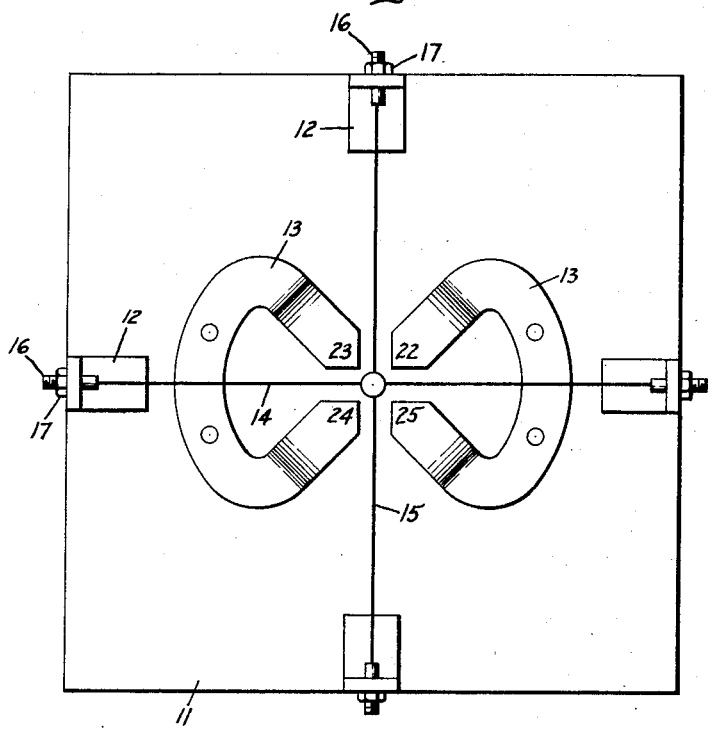
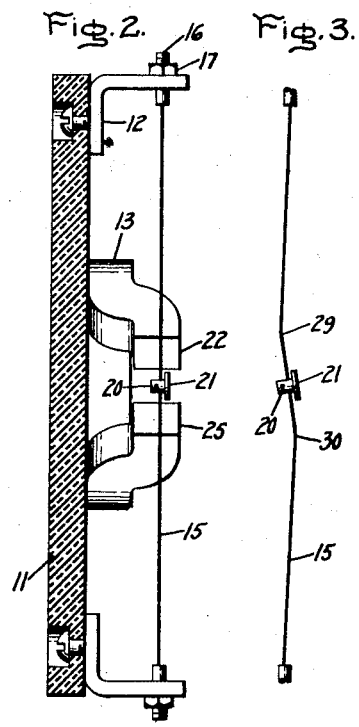
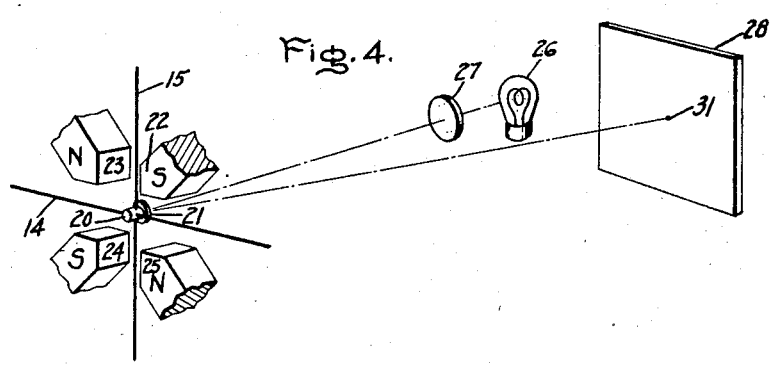
Inventor:
Joachim Pfaffenberger,
by Charles V. Muller
His Attorney.

Patented Dec. 26, 1933

1,941,319

UNITED STATES PATENT OFFICE 1,941,319

CURRENT-RESPONSIVE INDICATING AND RECORDING INSTRUMENT

Joachim Pfaffenberger, Berlin-Mariendorf, Germany, assignor to General Electric Company, a corporation of New York Application November 11, 1932, Serial No. 642,307, and in Germany November 11, 1931

12 Claims. (Cl. 171—95)

My invention relates to current-responsive indicating and recording instruments and concerns particularly devices by means of which a two-dimensional indication or record may be obtained.

It is an object of my invention to produce a sturdy, highly sensitive, easily adjustable device which is suitable for high frequency work. Other and further objects will become apparent as the description proceeds.

In accordance with my invention in its preferred form, I provide a pair of straight conductors placed at right angles mechanically connected at their mid-points but electrically insulated. A deflecting mirror cooperating with a source of light to produce an indicating beam is attached to the conductors at their intersection. Suitable means are provided for subjecting each of the conductors to transverse magnetic fields which have opposite polarity on opposite sides of the mirror. The use of single straight conductors facilitates the adjustment of the instrument since there is no necessity for providing means to equalize the tension of the conductors as is the case in ordinary bifilar instruments. The straight conductors are connected so as to respond to different quantities to be measured or recorded so that a two-dimensional indication is obtained and the instantaneous relationship between any two quantities may be indicated or recorded. The features of my invention which I believe to be novel and patentable will be pointed out in the claims appended hereto.

A more complete understanding of my invention itself, however, may be obtained by referring to the following description in connection with the accompanying drawing in which Fig. 1 is a plan view of one embodiment of my invention; Fig. 2 is an end view partly in section of the arrangement shown in Fig. 1; Fig. 3 illustrates the operation of the deflecting element shown in Fig. 2; and Fig. 4 is a schematic diagram in perspective illustrating the operation of my invention.

Referring now more in detail to the drawing in which like reference characters refer to like parts throughout, the apparatus may be mounted in any suitable manner, such as on a base 11. To the base 11 are attached the conductor supporting brackets 12 and a pair of permanent magnets 13, but it will be understood that any desired arrangement of permanent or electromagnets may also be employed. Conductors 14 and 15 are attached in any suitable manner to threaded pins 16 inserted in openings in the brackets 12. The tension of the conductors 14 and 15 may be adjusted by means of the nuts 17 engaging the threaded portion of pins 16. The conductors 14 and 15 are mechanically connected where they cross, but preferably electrically insulated. This may be done in any suitable manner, such as by means of a globule of insulating cement or by passing the conductors through an insulating member 20. A mirror 21 is attached to the conductors 14 and 15 at their intersection or to the member 20. The permanent magnets 13 are provided with raised V-shaped poles 22, 23, 24, and 25, lying in the four quadrants formed by the intersecting conductors 14 and 15. The arrangement is such that like poles are in opposite quadrants.

Each magnet pole is tapered to an edge to conform to the quadrant in which it is placed. Preferably the angles of the pole tips are made less than ninety degrees in order that the minimum airgaps will occur at the extreme tips of the poles, thereby making the flux densities in the airgaps greatest at the pole tips and increasing the possible tilt of mirror 21 by bringing the points at which the greatest forces and deflections are applied to the conductors 14 and 15 as close to the mirror 21 as possible. I have found that good results may be obtained by making the angles of the pole tips 75 to 80 degrees.

A source of light 26 and a focusing device 27 cooperating with the mirror 21 are provided to produce an indicating beam impinging on a screen 28 which may be, if desired, of translucent material when the device is used for visual indications, or of photo-sensitive material when the device is used for producing records. It will be understood that a suitable light-proof enclosure and means for shielding the screen 28 from the direct rays of the light source 26 will be employed, but for the sake of clarity such means are omitted in the drawing.

The operation of my device is as follows: In response to a current flowing in conductor 15, for example, the portion 29 of the conductor 15 adjacent the tips of poles 22 and 23 will be caused to deflect to the left (Fig. 3) whereas the portion 30 on the opposite side of the mirror 21 and adjacent the poles 24 and 25 will be caused to deflect to the right since the magnetic flux flows in the opposite direction between poles 24 and 25. By making the flux produced by the several poles as concentrated as possible and by bringing the maximum flux density as close to the intersection of the conductors as possible, or by causing the reversal of flux on opposite sides of the mirror to occur as abruptly as possible, the maximum tilt of the mirror will be produced for a given deflection of the conductor and consequently for a given current and magnetic field strength. It will be understood that the reaction between current flowing in conductor 14 and the fields produced by magnets 13 will cause a similar tilting of the mirror 21 but in a plane perpendicular to the tilting caused by conductor 15. Referring to Fig. 4 it will be seen that the effect of current variations in conductor 15 will be to cause the light spot 31 to move vertically along screen 28 and the effect of current variations in conductor 14 will be to cause light spot 31 to move horizontally along screen 28. Consequently, when both conductors 14 and 15 are energized, the path of the light spot will trace a curve representing the relationship between the values of current in conductors 14 and 15. If desired, the screen 28 may be vertically and horizontally ruled in order to form a two-dimensional scale. Apparatus of the type disclosed is of value where it is desired to obtain an indication or record of the relationship between two quantities varying with relatively high frequency and which may be capable of supplying relatively little power to the measuring instrument. For example, hysteresis curves may be traced by connecting the conductors so that the current in one is responsive to the variations in flux in a test sample, and the current in the other conductor is responsive to variations in magneto-motive force or magnetizing current. Obviously, curves may be obtained of relationships between current and voltage or between any other desired quantities. One of the conductors may also be employed to provide a time axis by causing a current to flow therein which varies continuously with time. Such timing currents may be produced in any desired manner such as, for example, by apparatus disclosed in U. S. patents to Bedell, 1,707,594, Kipping, 1,592,274, or Rüdenberg, 1,695,719.

Under the provisions of the patent statutes I have described the principle of operation of my invention, together with the apparatus which I now consider to represent the best embodiment thereof, but I desire to have it understood that the apparatus shown is only illustrative and that the invention may be carried out by other means.

What I claim as new and desire to secure by Letters Patent of the United States is:

1. A quadrantal oscillograph comprising a pair of crossed straight conductors connected in different circuits and carrying a mirror at their intersection, a source of light cooperating with said mirror to produce an indicating beam, magnetic field producing means having poles in each of the quadrants formed by said crossed conductors, like poles being in opposite quadrants, thereby causing said beam to be deflected in a given plane in response to current variations in one of said circuits, and in a transverse plane in response to current variations in the other of said circuits.

2. A current-responsive instrument comprising a pair of crossed straight conductors connected in different circuits and insulated from each other but mechanically connected and carrying a mirror at their intersection, a source of light cooperating with said mirror to produce an indicating beam, magnetic field producing means having poles in each of the quadrants formed by said crossed conductors, like poles being in opposite quadrants, thereby causing said beam to be deflected in a given plane in response to current variations in one of said circuits, and in a transverse plane in response to current variations in the other of said circuits.

3. A quadrantal recording instrument comprising a pair of crossed straight conductors connected in different circuits and carrying a mirror at their intersection, a source of light cooperating with said mirror to produce an indicating beam, a sheet of photographic material cooperating with said indicating beam, magnetic field producing means having poles in each of the quadrants formed by said crossed conductors, like poles being in opposite quadrants, thereby producing a two-dimensional record upon said photographic sheet in response to current variations in said circuits, each of which correspond to one of the dimensions of said record.

4. A two-dimensional electrical indicating instrument comprising a pair of crossed straight conductors connected in different circuits and carrying a mirror at their intersection, a source of light cooperating with said mirror to produce an indicating beam, a screen cooperating with said beam, magnetic field producing means having poles in each of the quadrants formed by said crossed conductors, like poles being in opposite quadrants, thereby causing said beam to be deflected in a given plane in response to current variations in one of said circuits, and in a transverse plane in response to current variations in the other of said circuits.

5. A current-responsive instrument comprising a pair of crossed straight conductors connected in different circuits and carrying a mirror at their intersection, a source of light cooperating with said mirror to produce an indicating beam, magnetic field producing means having V-shaped poles in each of the quadrants formed by said crossed conductors, the planes forming the sides of the V-shaped portions of said poles being substantially perpendicular to the plane along which said crossed conductors normally lie, like poles being in opposite quadrants, thereby causing said beam to be deflected in a given plane in response to current variations in one of said circuits and in a transverse plane in response to current variations in the other of said circuits.

6. A current-responsive instrument comprising a pair of crossed straight conductors connected in different circuits and carrying a mirror at their intersection, a source of light cooperating with said mirror to produce an indicating beam, magnetic field producing means having V-shaped poles in each of the quadrants formed by said crossed conductors, like poles being in opposite quadrants, thereby causing said beam to be deflected in a given plane in response to current variations in one of said circuits and in a transverse plane in response to current variations in the other of said circuits, the sides of said V-shaped poles making dihedral angles of less than 90 degrees for the purpose of increasing the field strength at the extreme tips of the poles.

7. A current-responsive instrument comprising a pair of crossed straight conductors connected in different circuits and carrying a mirror at their intersection, a source of light cooperating with said mirror to produce an indicating beam, magnetic field producing means having V-shaped poles in each of the quadrants formed by said crossed conductors, like poles being in opposite quadrants, thereby causing said beam to be deflected in a given plane in response to current variations in one of said circuits, and in a transverse plane in response to current variations in the other of said circuits, the sides of the V-shaped portions of said poles making angles lying between 75 and 80 degrees for the purpose of causing a relatively abrupt reversal in magnitization on opposite sides of said mirror.

8. A current-responsive instrument comprising a pair of conductors situated substantially at right angles to each other connected in different circuits and mechanically connected substantially midway their ends but electrically insulated and carrying a mirror at their intersection, a source of light cooperating with said mirror to produce an indicating beam, means for producing magnetic fields transverse to each of said wires and having opposite polarities on opposite sides of said mirror, thereby causing said beam to be deflected in a given plane in response to current variations in one of said circuits and in a transverse plane in response to current variations in the other of said circuits.

9. A current-responsive instrument comprising a straight conductor carrying a mirror, a source of light cooperating with said mirror to produce an indicating beam, means for producing a magnetic field transverse to said conductor and having a given polarity on one side of said mirror and the opposite polarity on the other side of said mirror for the purpose of causing said wire to move in opposite directions on opposite sides of said mirror, thereby obtaining maximum deflection of said mirror for a given current variation.

10. A light-beam instrument comprising a plurality of electrical conductors so supported as to permit transverse movement, means for subjecting said conductors to transverse magnetic fields, a mirror supported so as to be subject to the joint movement of said conductors in said fields, a stationary light source, and means for receiving a beam of light reflected by said mirror from said light source.

11. A light-beam instrument comprising a pair of electrical conductors supported to extend in different directions, means for subjecting each of said conductors to a transverse magnetic field, a mirror supported so as to be subject to the joint movement of said conductors in said field, a stationary light source, and means for receiving a beam of light reflected by said mirror from said light source.

12. A light-beam instrument comprising means for producing a magnetic field, a plurality of electrical conductors supported to extend through said field in different directions, a mirror supported so as to be subject to the joint movement of said conductors in said field, a stationary light source, and means for receiving a beam of light reflected by said mirror from said light source.

JOACHIM PFAFFENBERGER.